US012443817B2

(12) United States Patent
Wu et al.

(10) Patent No.: US 12,443,817 B2
(45) Date of Patent: Oct. 14, 2025

(54) ENHANCED QUICK RESPONSE (QR) CODE SCAN SECURITY

(71) Applicant: Citrix Systems, Inc., Fort Lauderdale, FL (US)

(72) Inventors: Hao Wu, Shenzhen (CN); Robert O'keefe, Taplow (GB)

(*) Notice: Subject to any disclaimer, the term of this patent is extended or adjusted under 35 U.S.C. 154(b) by 572 days.

(21) Appl. No.: 17/870,154

(22) Filed: Jul. 21, 2022

(65) Prior Publication Data

US 2023/0419067 A1    Dec. 28, 2023

Related U.S. Application Data

(63) Continuation of application No. PCT/CN2022/100380, filed on Jun. 22, 2022.

(51) Int. Cl.
*G06K 19/06* (2006.01)
*G06F 21/30* (2013.01)
*H04L 9/08* (2006.01)
*H04L 9/32* (2006.01)

(52) U.S. Cl.
CPC ....... *G06K 19/06037* (2013.01); *G06F 21/30* (2013.01); *H04L 9/0825* (2013.01); *H04L 9/3247* (2013.01)

(58) Field of Classification Search
CPC .. G06K 19/06037; G06F 21/30; H04L 9/0825
USPC .......................................................... 235/494
See application file for complete search history.

(56) References Cited

U.S. PATENT DOCUMENTS

| | | | |
|---|---|---|---|
| 9,665,760 B1* | 5/2017 | Lei | G06K 7/10881 |
| 2021/0142023 A1* | 5/2021 | Li | G06K 7/1443 |
| 2023/0419067 A1* | 12/2023 | Wu | H04L 9/3226 |

* cited by examiner

Primary Examiner — Allyson N Trail (57) ABSTRACT

Methods and systems for enhanced QR code security are described herein. A computing platform may generate a QR code that includes an information code and a server code. The computing platform may split the QR code into first and second portions, where the first portion includes at least the server code. The computing platform may send, to a QR display device, the first portion for display. The computing platform may receive, from a user device, authentication credentials and a request for the second portion, sent to the computing platform based on identification of the computing platform through scanning, by the user device, the server code at the QR display device. The computing platform may send, based on validating the authentication credentials and to the user device, the second portion, where the user device is configured to re-assemble the QR code based on the first and second portions.

20 Claims, 7 Drawing Sheets

ENHANCED QUICK RESPONSE (QR) CODE SCAN SECURITY

CROSS-REFERENCE

This application is a continuation application of International Application No. PCT/CN2022/100380, filed Jun. 22, 2022, and entitled "Enhanced Quick Response (QR) Code Scan Security," the contents of which are hereby incorporated by reference in its entirety.

FIELD

Aspects described herein generally relate to quick response (QR) codes, electronic messaging systems, and hardware and software related thereto. More specifically, one or more aspects described herein provide techniques to improve QR code scan security by splitting a QR code into multiple portions, one of which may be initially scanned by a user device to identify a source of the second portion, and a second of which may be sent to the user device upon request and upon successful validation of the user device.

BACKGROUND

In some instances, QR codes may be used to transmit sensitive and/or other information. Such QR codes may be scanned by a user device, which may result in the corresponding information being displayed at the user device. In some instances, however, unauthorized individuals may access sensitive information stored in these QR codes if they are able to scan them, e.g., using a camera on a modern smartphone to automatically decode the QR code.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below. As QR codes are increasingly used to transmit or otherwise convey sensitive information, it is important to identify way to improve the security of QR code scanning.

In one or more embodiments described herein, a computing platform may generate a quick response (QR) code that includes an information code containing information and a server code containing an identity of the computing platform. The computing platform may split the QR code into a first portion of the QR code and a second portion of the QR code, where the first portion of the QR code includes at least the server code. The computing platform may send, to a QR display device, the first portion of the QR code for display. The computing platform may receive, from a user device, authentication credentials and a request for the second portion of the QR code, where the request for the second portion of the QR code may be sent to the computing platform based on identification of the computing platform through scanning, by the user device, the server code at the QR display device. The computing platform may send, based on validating the authentication credentials and to the user device, the second portion of the QR code, where the user device may be configured to re-assemble the QR code based on the first portion of the QR code and the second QR code to access the information.

In one or more instances, the server code may be a second QR code, overlaid on the QR code. In one or more instances, splitting the QR code may include removing a portion of the QR code.

In one or more examples, splitting the QR code may include removing one or more additional portions of the QR code. In one or more examples, the one or more additional portions of the QR code may be a different shape than the portion of the QR code.

In one or more instances, the first portion of the QR code or the second portion of the QR code may include information explaining reconstruction of the QR code. In one or more instances, the server code may have a different background color than the information code.

In one or more examples, the information might not be accessed without both the first portion of the QR code and the second portion of the QR code. In one or more examples, validating the authentication credentials may include validating that a time gap between creation of the QR code and receipt of the authentication credentials is less than a predetermined time threshold.

In one or more instances, validating the authentication credentials may include validating that a cell phone number of the user device is on a whitelist stored at the computing platform. In one or more instances, sending the second portion of the QR code may include sending a short message service (SMS) message that includes the second portion of the QR code.

In one or more examples, the user device may be configured with a QR scanner application, and the QR scanner application may be preconfigured to: identify, based on the first portion of the QR code, locations of missing portions of the QR code, and combine, based on the identified locations, the second portion of the QR code with the first portion of the QR code to generate the QR code. In one or more examples, validating the authentication credentials may include validating a public key and a user signature.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards enhancing security measures for accessing information available via quick response (QR) codes. For example, QR codes are used in many scenarios such as authentication and payment, and exposing these QR codes may cause risks of information leakage. The protection of QR codes from unauthorized individuals is critical to QR code security. For example, anyone who may access a QR code may scan the QR code (e.g., using a mobile phone or other device), and may access the corresponding information (which may, e.g., be a payment code, resulting in loss of money).

To address this security threat, in some instances, QR codes may be set with a timeout period (e.g., 1 minute, or other time period). However, the risk of information leakage may still exist as long as a hacker may access the QR code before expiration of the timeout period.

Accordingly, described herein are further security measures related to QR codes. For example, as described further below, a server may generate a QR code, but may only deliver one part of the QR code to a client for scanning, and the other part to a client device directly as an image. In these instances, to restore the original QR code, the client device may assemble the QR code by combining the scanned part and the image part.

In comparison to the above described example where the QR code is protected merely with a timeout period, the solution described herein (e.g., partial code delivery) offers a more secure solution. For example, this solution may prevent the stealing of QR codes since only a client device that both scans the QR code and has another portion of the QR code may restore the completed QR code.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
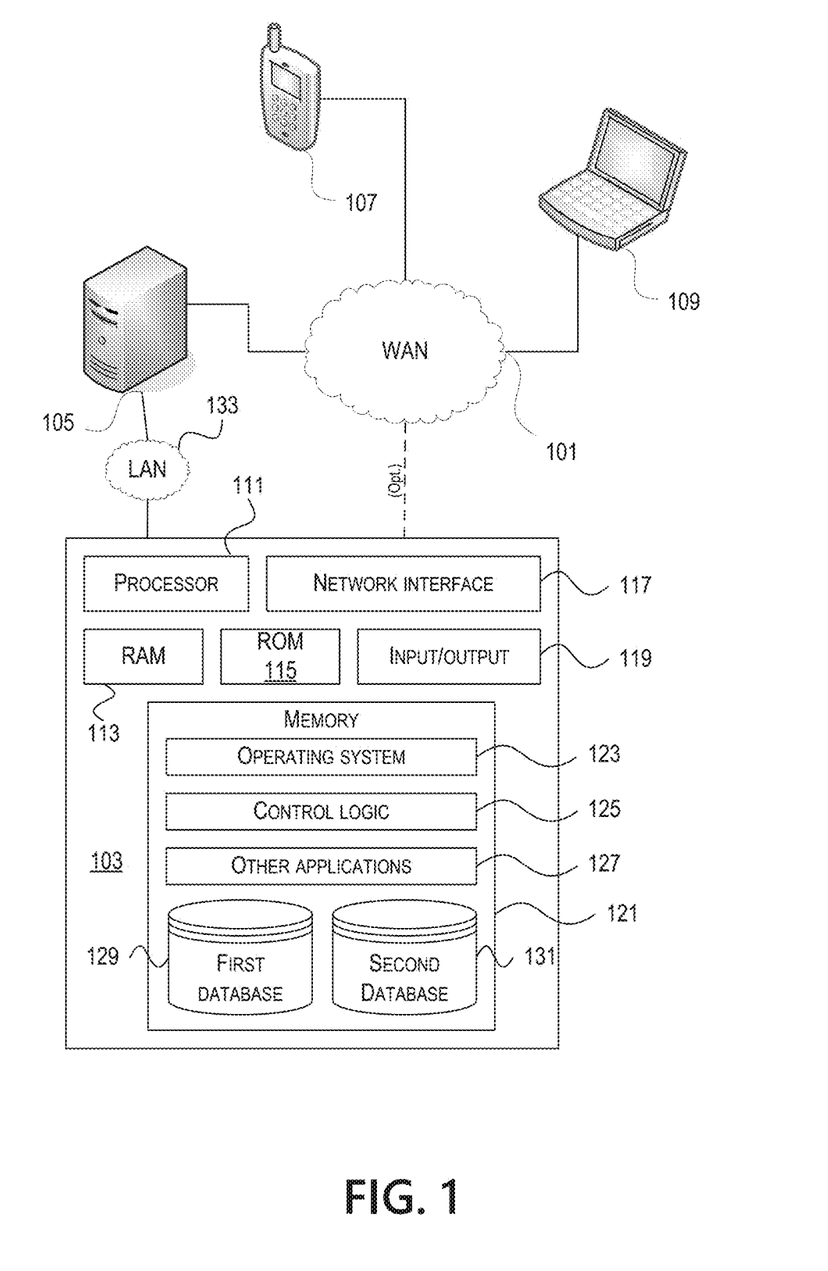
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
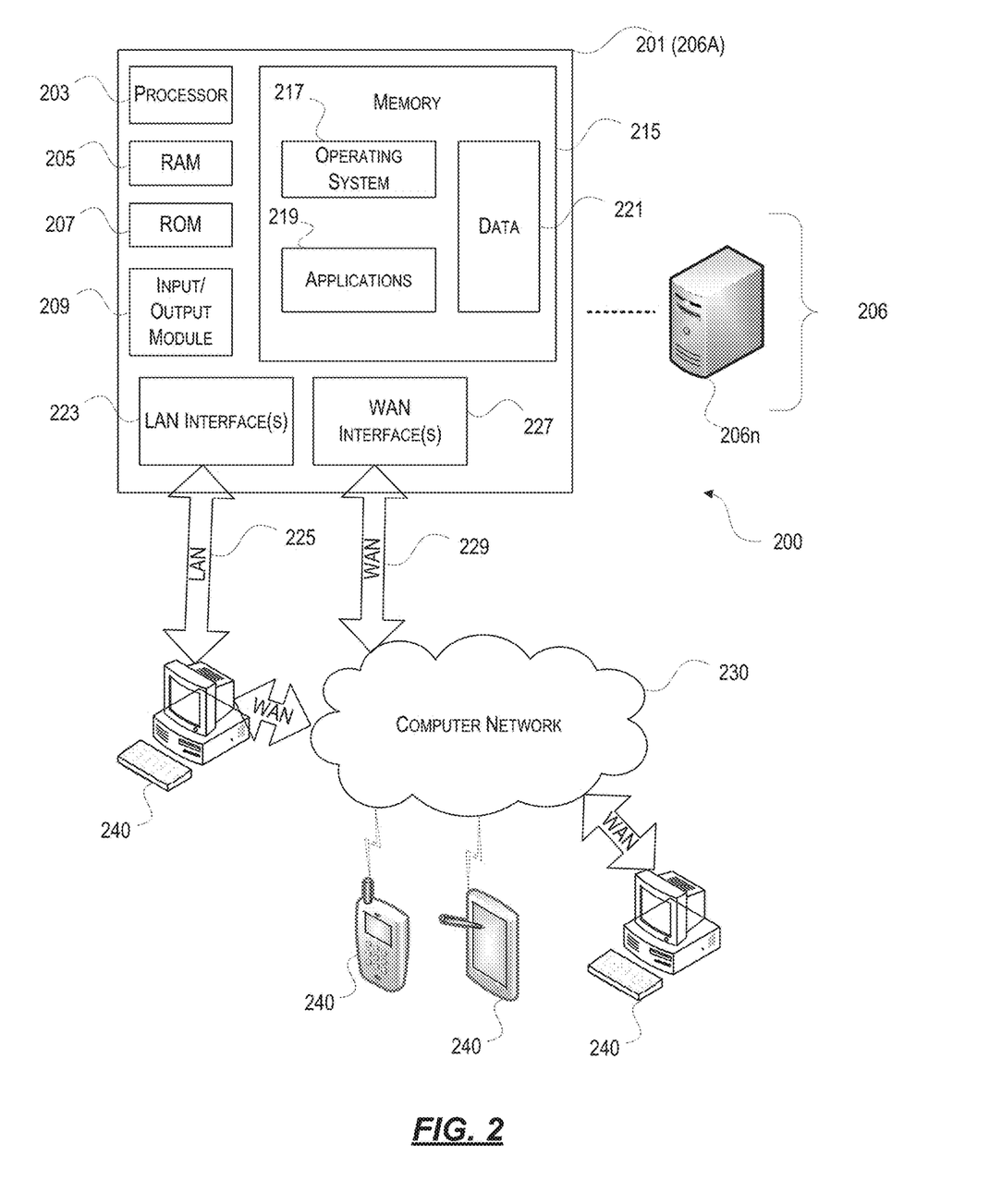
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Enhanced Quick Response (QR) Code Scan Security

Figure 3A:
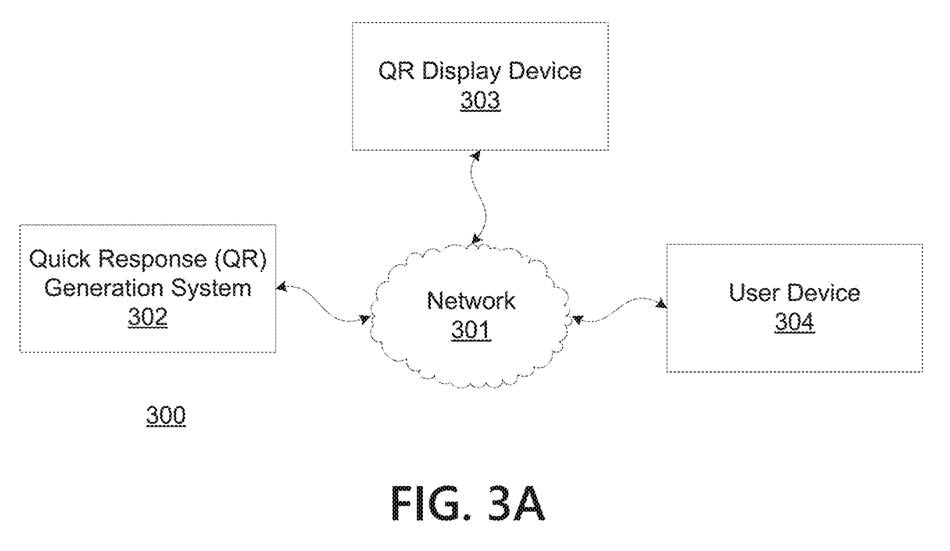
FIGS. 3A-3B depict an illustrative computing architecture that may be used to enhance QR code scan security in accordance with one or more illustrative aspects described herein.
Figure 3B:
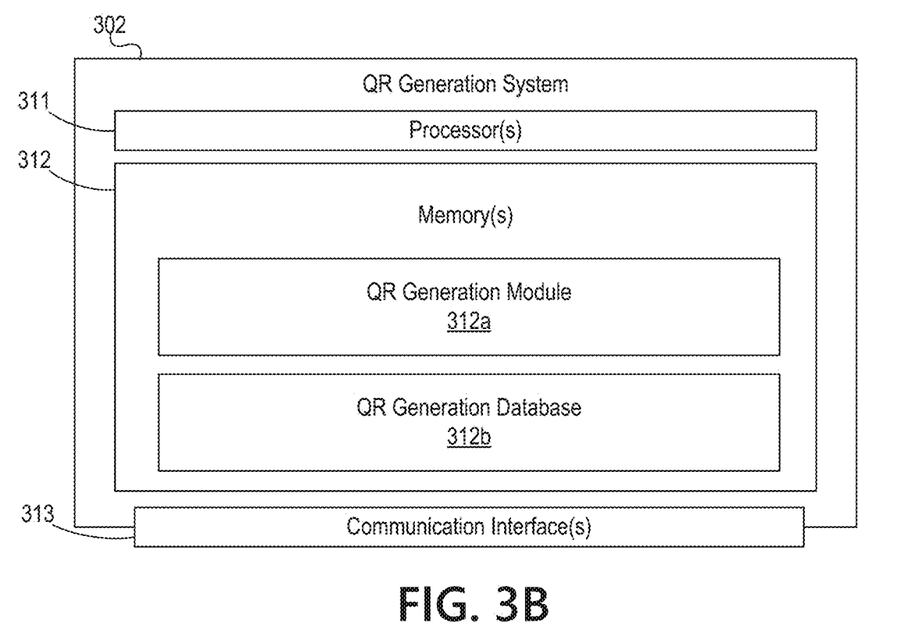

FIGS. 3A and 3B depict an illustrative computing environment for enhancing QR code scan security in accordance with one or more example embodiments. Referring to FIG. 3A, computing environment 300 may include one or more computer systems. For example, computing environment 300 may include QR generation system 302, QR display device 303, and user device 304.

As illustrated further below, QR generation system 302 (which may be similar to web server 105 or data server 103, shown in FIG. 1, and/or computing device 201 or server 206, shown in FIG. 2), may be configured for QR code generation. For example, the QR generation system 302 may be configured to embed information into a QR code, which may be accessed by scanning or otherwise assembling the QR code. In some instances, the QR generation system 302 may be configured to split QR codes into one or more pieces, which may be reassembled to access the corresponding information. In some instances, the QR generation system 302 may also be configured to perform authentication of a user and/or device to validate whether or not a QR code (or portion thereof) may be shared with that user/device (e.g., based on login information, device identifiers, user identifiers, and/or other information). In some instances, the QR generation system 302 may be configured to communicate with one or more user devices (e.g., QR display device 303, user device 304, and/or other devices) to provide the QR codes.

QR display device 303 (which may, e.g., be a computing device similar to devices 107 or 109, shown in FIG. 1, or client machine 240, shown in FIG. 2) may include one or more computing devices configured to perform one or more of the functions described herein. For example, QR display device 303 may be a desktop computer, laptop computer, and/or other device including a display. As such, the QR display device 303 may be configured to receive QR codes from the QR generation system 302, and to display the codes accordingly. In doing so, the QR display device 303 may make the QR codes available for scan by another device (e.g., user device 304, and/or other devices).

User device 304 (which may, e.g., be a computing device similar to devices 107 or 109, shown in FIG. 1, or client machine 240, shown in FIG. 2) may include one or more computing devices configured to perform one or more of the functions described herein. For example, user device 304 may be a mobile device, a tablet, a smart phone, augmented reality glasses, and/or other device configured to host, store, or otherwise support a QR scanning application. In some instances, the user device 304 may be configured to use the QR scanning application to scan a QR code, displayed at the QR display device 303, and to access information accordingly. In some instances, the user device 304 may be configured to communicate with the QR generation system 302 to authenticate itself for purposes of accessing information corresponding to the QR codes. In some instances, the user device 304 may also be configured to perform QR code reconstruction, so as to combine a first portion of a QR code, accessed at the QR display device 303, with at least a second portion of the QR code, received from the QR generation system 302.

Computing environment 300 may also include one or more networks, which may interconnect QR generation system 302, QR display device 303, and user device 304. For example, computing environment 300 may include a network 301 (which may e.g., interconnect QR generation system 302, QR display device 303, and/or user device 304). In some instances, the network 301 may be similar to computer network 230, which is shown in FIG. 2.

In one or more arrangements, QR generation system 302, QR display device 303, user device 304, and/or the other systems included in computing environment 300 may be any type of computing device capable of supporting QR code generation, scanning, reassembly, and/or other QR functions. For example, QR generation system 302, QR display device 303, user device 304, and/or the other systems included in computing environment 300 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of QR generation system 302, QR display device 303, and/or user device 304 may, in some instances, be special purpose computing devices configured to perform specific functions.

Referring to FIG. 3B, QR generation system 302 may include one or more processors 311, memory 312, and communication interface 313. A data bus may interconnect processor 311, memory 312, and communication interface 313. Communication interface 313 may be a network interface configured to support communication between the QR generation system 302 and one or more networks (e.g., network 301, or the like). Memory 312 may include one or more program modules having instructions that when executed by processor 311 cause QR generation system 302 to perform one or more functions described herein and/or access one or more databases that may store and/or otherwise maintain information which may be used by such program modules and/or processor 311. In some instances, the one or more program modules and/or databases may be stored by and/or maintained in different memory units of QR generation system 302. For example, QR generation system 302 may have, host, store, and/or include a QR generation module 312a. QR generation module 312a may enable or otherwise perform enhanced QR code generation, as described in greater detail below. QR generation database 312b may store or otherwise host information that may support the QR code generation performed by the QR generation module 312a and/or the QR generation database 312b.

Figure 4A:
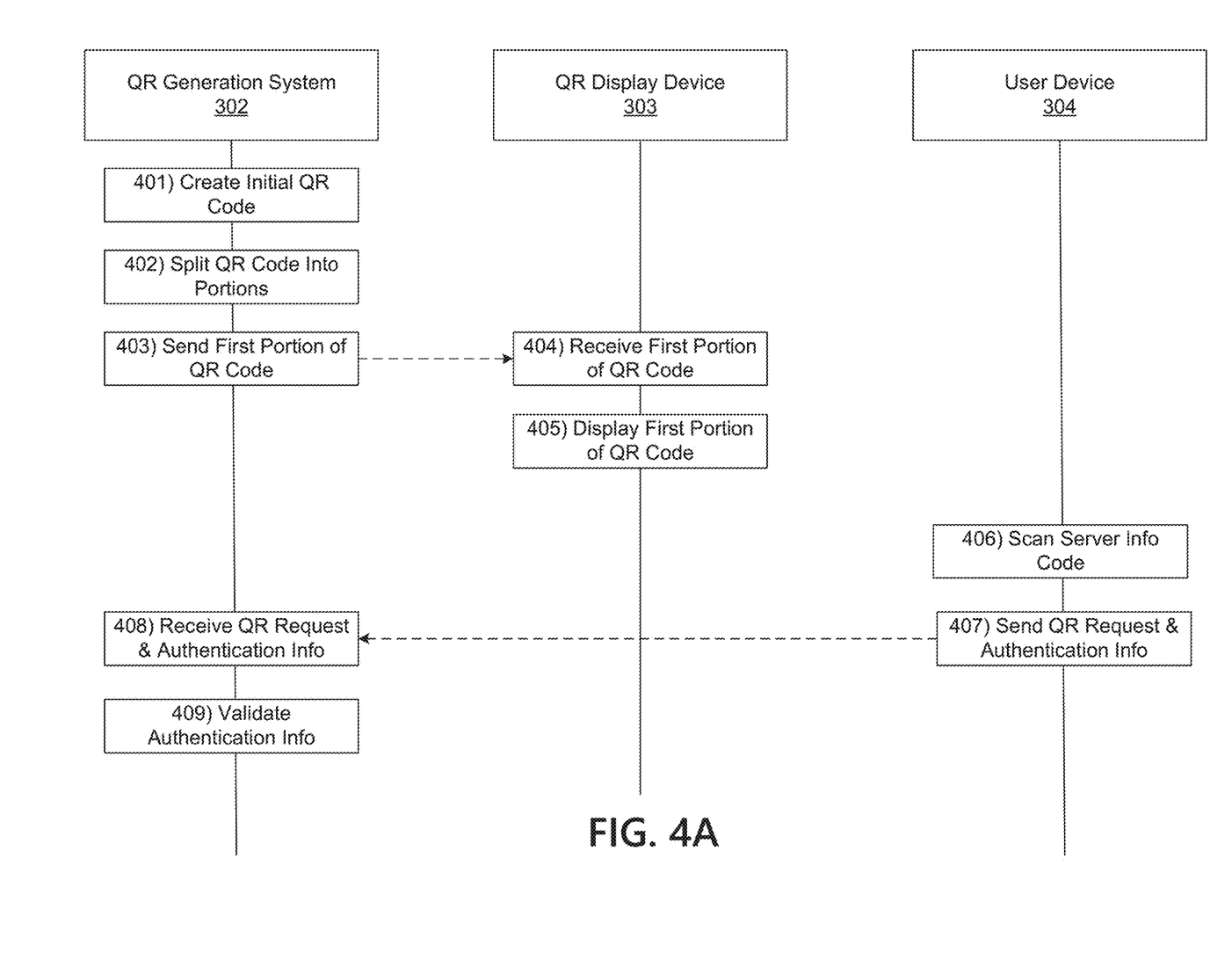
FIGS. 4A-4B depict an illustrative event sequence that may be used to enhance QR code scan security in accordance with one or more illustrative aspects described herein.
Figure 4B:
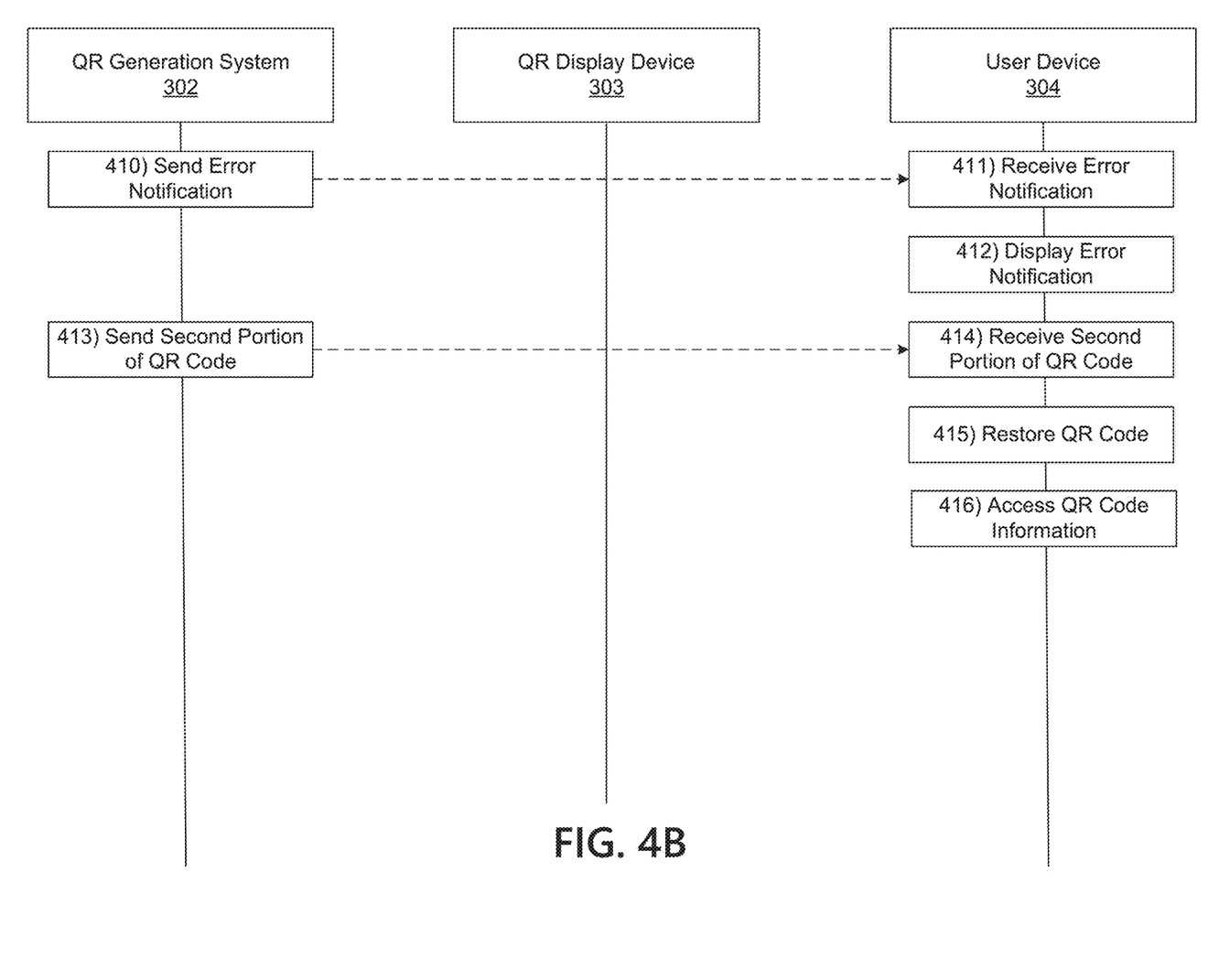

FIGS. 4A-4B depict an illustrative event sequence for enhancing QR scan security in accordance with one or more example embodiments. It should be understood that steps 401-416 may, in some instances, occur in the order as shown with regard to FIGS. 4A-4B. For example, after completing step 409 of FIG. 4A, the event sequence may proceed to step 410 of FIG. 4B.

Figure 6A:
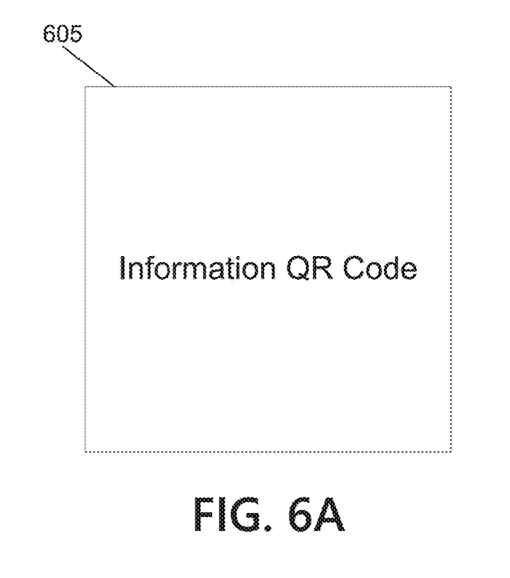
FIGS. 6A-6D depict illustrative QR codes that depict the enhanced QR scan security process in accordance with one or more illustrative aspects described herein.

Referring to FIG. 4A, at step 401, the QR generation system 302 may create an initial QR code (e.g., a frame QR code). For example, the QR generation system 302 may generate a QR code similar to QR code 605, which is shown in FIG. 6A, into which information is embedded (e.g., an information code).

Figure 6B:
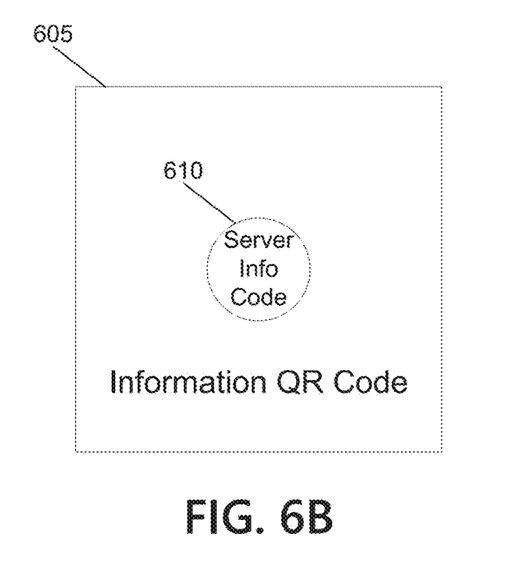

In some instances, in generating the initial QR code, the QR generation system 302 may also generate a server QR code, which may, e.g., be similar to server QR code 610, which is shown in FIG. 6B. For example, the QR generation system 302 may generate a QR code that includes information identifying the QR generation system 302, and that may be used to communicate with the QR generation system 302. In some instances, in generating the server QR code, the QR generation system may generate a QR code that may be changed at a predetermined time interval, based on receipt of a predetermined number of requests, and/or otherwise. For example, the QR generation system 302 may be configured to change the server QR code and/or the information embedded within to include different parameters (e.g., a unique identifier may be appended to the uniform resource locator (URL) of the QR generation system 302 each time the server QR code is created). In some instances, the QR generation system 302 may include the server QR code as an overlay on the initial QR code, embedded within the initial QR code, and/or otherwise. In some instances, a background color of the initial QR code may be different than a background color of the server QR code. For example, the initial QR code may be black/white, while the server QR code may be red/white. Although illustrated as a circular code, the server QR code may be any other shape without departing from the scope of the disclosure.

Figure 6C:
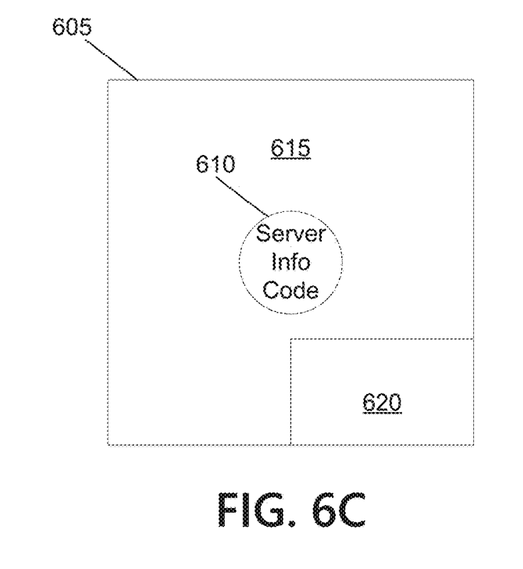
Figure 6D:
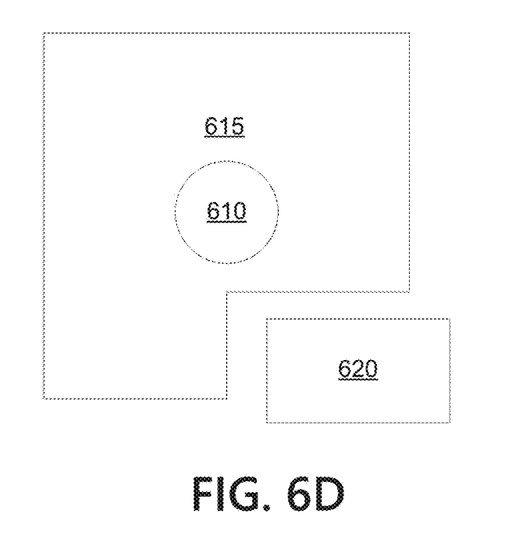

At step 402, the QR generation server 302 may split the initial QR code into at least a first portion of the initial QR code and a second portion of the initial QR code. For example, the QR generation server 302 may split the initial QR code (e.g., QR code 605) into the first QR code portion 615 and the second QR code portion 620 (e.g., as shown in FIG. 6C and FIG. 6D). In generating the first QR code portion 615, the QR generation system 302 may include the server QR code in the first QR code portion 615 (e.g., to enable a QR code scanner, such as a scanner at the user device 304, to access an identity of the QR generation system 302 based on the first QR code portion 615). Although the second QR code portion 620 is shown as a rectangle, it may be any shape without departing from the scope of the disclosure. Similarly, although the second QR code portion 620 is shown as a single shape, it may correspond to any number of pieces/portions of the initial QR code that have been trimmed off (and may, in some instances, be a different shape than the first QR code portion 615). For example, the second QR code portion 620 may correspond to a rectangle in the top left of the initial QR code in addition to the rectangle in the bottom right of the initial QR code. In some instances, the QR generation server 302 may split the initial QR code using a randomized procedure. For example, the QR generation server 302 may split QR codes in different directions (e.g., the upper left, upper right, bottom left, bottom right, and/or other portions) in a randomized splitting method. In some instances, the QR generation server 302 may split the QR code in a different manner each time the initial QR code is regenerated, updated, or otherwise.

In some instances, in splitting the initial QR code, the QR generation server 302 may configure the first portion for display at the QR display device 303 and the second portion for transmission to the QR display device 303 (e.g., via short message service (SMS) messaging, or otherwise).

At step 403, the QR generation system 302 may send the first QR code portion 615 to the QR display device 303 for display. In some instances, the QR generation system 302 may also send one or more commands directing the QR display device 303 to display the first QR code portion 615.

At step 404, the QR display device 303 may receive the first QR code portion 615. In some instances, the QR display device 303 may also receive the one or more commands directing the QR display device 303 to display the first QR code portion 615.

At step 405, based on or in response to the one or more commands directing the QR display device 303 to display the first QR code portion 615, the QR display device 303 may display the first QR code portion 615. In doing so, the QR display device 303 may also display the server QR code (as included within the first QR code portion 615).

Although steps 403-405 describe sending the first QR code portion 615 to a QR display device 303, the first QR code portion 615 may be printed and/or otherwise displayed in methods different than a digital display without departing from the scope of the disclosure, so long as the first QR code portion 615 is presented in a way that enables scanning by a QR code scanner.

At step 406, the user device 304 may scan the first QR code portion 615 at the QR display device 303. In doing so, the user device 304 might not have access to the information embedded within the initial QR code (e.g., because the second QR code portion 620 is missing). However, the user device 304 may access information of the QR generation system 302 from the server QR code, which may be included within the first QR code portion 615 in its entirety. For example, the user device 304 may access an IP address, or other identifier of the QR generation system 302, which may enable the user device 304 to communicate with the QR generation system 302. In some instances, the user device 304 may scan the first QR code portion 615 using a camera, QR scanner, and/or other application.

At step 407, using the server information identified by the user device 304 from the server QR code at step 406, the user device 304 may communicate with the QR generation system 302. For example, the user device 304 may send a request to the QR generation system 302 requesting the second QR code portion 620 and indicating that the first QR code portion 615 has been scanned. In some instances, the user device 304 may also send authentication credentials such as a cell phone number, log in information, user identifier information, device identifier information, and/or other information that may be used to verify the user device 304 and/or a user thereof.

At step 408, the QR generation system 302 may receive the request for the second QR code portion 620 and the authentication information sent at step 407. At step 409, the QR generation system 302 may validate the authentication information. For example, the QR generation system 302 may compare the authentication information to a whitelist, trusted device list, and/or other information that may distinguish devices/users that may be given access to the information embedded within the initial QR code. In these instances, if the QR generation system 302 identifies that the authentication information matches the whitelist or other verified information, the QR generation system 302 may identify that the authentication credentials are valid. If instead the QR generation system 302 identifies that the authentication information does not match the whitelist or other information, the QR generation system 302 may identify that the authentication credentials are not valid.

Additionally or alternatively, the QR generation system 302 may compare a time gap between creation of the initial QR code and the acknowledgement by the user device 304 (e.g., by sending the request for the second QR code portion 620) to a predetermined time threshold. In these instances, if the QR generation system 302 identifies that the time gap exceeds the predetermined time threshold, the QR generation system 302 may identify that the authentication credentials are not valid. Otherwise, if the time gap does not exceed the predetermined time threshold, the QR generation system 302 may identify that the authentication credentials are valid.

Additionally or alternatively, the QR generation system 302 and the user device 304 may perform a key exchange (including one or more public keys, private keys, signatures, and/or other information). In these instances, the QR generation system 302 may validate the key(s) to identify whether or not the authentication credentials are valid. If the authentication credentials are not valid, the QR generation system 302 may proceed to step 410. Otherwise, if the authentication credentials are valid, the QR generation system 302 may proceed to step 413.

Referring to FIG. 4B, at step 410, the QR generation system 302 may send an error notification to the user device 304. For example, the QR generation system 302 may send an error notification indicating that the authentication credentials were not validated, and the second QR code portion 620 will not be sent. In some instances, the QR generation system 302 may also send one or more commands directing the user device 304 to display the error notification.

At step 411, the user device 304 may receive the error notification sent at step 410. In some instances, the user device 304 may also receive the one or more commands directing the user device 304 to display the error notification.

At step 412, based on or in response to the one or more commands directing the user device 304 to display the error notification, the user device 304 may display the error notification.

Returning to step 409, if the QR generation system 302 identified that the authentication credentials were valid, the QR generation system 302 may proceed to step 413. At step 413, the QR generation system 302 may send the second QR code portion 620 to the user device 304. For example, the QR generation system 302 may send the second QR code portion 620 to the user device 304 in an SMS message based on the cell number received as part of the authentication information.

At step 414, the user device 304 may receive the second QR code portion 620, sent at step 413. For example, the user device 304 may receive the second QR code portion 620 in an SMS or other electronic message.

At step 415, the user device 304 may restore the initial QR code. For example, the user device 304 may combine the second QR code portion 620 (received at step 414) with the first QR code portion 615 (accessed at step 406). In some instances, to do so, the user device 304 may identify remaining area(s) of the first QR code portion 615 needed to complete a square corresponding to the initial QR code, and may match the second QR code portion 620 to this area. Additionally or alternatively, the user device 304 may have received, from the QR generation system 302 and along with the second QR code portion 620 (or identified from the information of the first QR code portion 615), instructions for combining the first QR code portion 615 and second QR code portion 620 (e.g., explaining reconstruction of the initial QR code).

At step 416, once the initial QR code has been restored using the first QR code portion 615 and the second QR code portion 620, the user device 304 may access the information stored and/or otherwise embedded into the initial QR code (which, e.g., might not have been accessible from the first QR code portion 615 alone).

Figure 5:
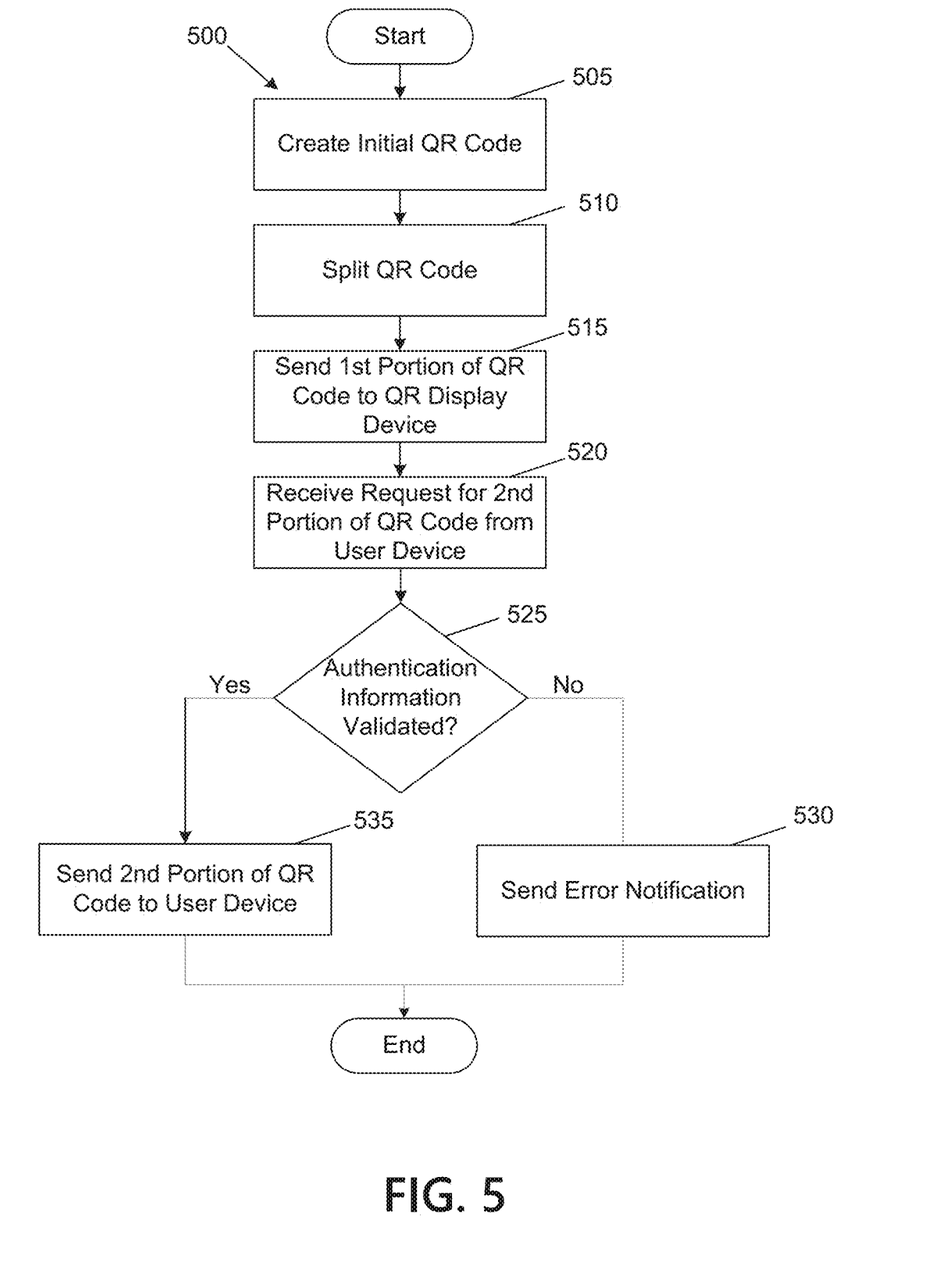
FIG. 5 depicts an illustrative method that may be used to enhance QR scan security in accordance with one or more illustrative aspects described herein.

FIG. 5 depicts an illustrative method 500 for enhancing QR scan security in accordance with one or more example embodiments. For example, at step 505, a computing platform may create an initial QR code. At step 510, the computing platform may split the initial QR code into a first portion and a second portion. At step 515, the computing platform may send the first portion of the QR code to a QR display device. At step 520, the computing platform may receive a request for the second portion of the QR code from a user device. At step 525, the computing platform may identify whether or not the authentication information is validated. If the authentication information is validated, the computing platform may proceed to step 535. If the authentication information is not validated, the computing platform may proceed to step 530.

At step 530, the computing platform may send an error notification to the user device. At step 535, the computing platform may send the second portion of the QR code to the user device.

The following paragraphs (M1) through (M13) describe examples of methods that may be implemented in accordance with the present disclosure.

(M1) A method comprising: generating, by a computing platform, a quick response (QR) code that includes an information code containing information and a server code containing an identity of the computing platform; splitting the QR code into a first portion of the QR code and a second portion of the QR code, wherein the first portion of the QR code includes at least the server code; sending, to a QR display device, the first portion of the QR code for display; receiving, from a user device, authentication credentials and a request for the second portion of the QR code, wherein the request for the second portion of the QR code is sent to the computing platform based on identification of the computing platform through scanning, by the user device, the server code at the QR display device; and sending, based on validating the authentication credentials and to the user device, the second portion of the QR code, wherein the user device is configured to re-assemble the QR code based on the first portion of the QR code and the second QR code to access the information.

(M2) A method may be performed as described in paragraph (M1) wherein the server code comprises a second QR code, overlaid on the QR code.

(M3) A method may be performed as described in any of paragraphs (M1) through (M2), wherein splitting the QR code comprises removing a portion of the QR code.

(M4) A method may be performed as described in paragraph (M3) wherein splitting the QR code comprises removing one or more additional portions of the QR code.

(M5) A method may be performed as described in paragraph (M4) wherein the one or more additional portions of the QR code are a different shape than the portion of the QR code.

(M6) A method may be performed as described in any of paragraphs (M1) through (M5) wherein one of: the first portion of the QR code or the second portion of the QR code includes information explaining reconstruction of the QR code.

(M7) A method may be performed as described in any of paragraphs (M1) through (M6) wherein the server code has a different background color than the information code.

(M8) A method may be performed as described in any of paragraphs (M1) through (M7) wherein the information cannot be accessed without both the first portion of the QR code and the second portion of the QR code.

(M9) A method may be performed as described in any of paragraphs (M1) through (M8) wherein validating the authentication credentials comprises validating that a time gap between creation of the QR code and receipt of the authentication credentials is less than a predetermined time threshold.

(M10) A method may be performed as described in any of paragraphs (M1) through (M9) wherein validating the authentication credentials comprises validating that a cell phone number of the user device is on a whitelist stored at the computing platform.

(M11) A method may be performed as described in any of paragraphs (M1) through (M10) wherein sending the second portion of the QR code comprises sending a short message service (SMS) message that includes the second portion of the QR code.

(M12) A method may be performed as described in any of paragraphs (M1) through (M11) wherein the user device is configured with a QR scanner application, and wherein the QR scanner application is preconfigured to: identify, based on the first portion of the QR code, locations of missing portions of the QR code, and combine, based on the identified locations, the second portion of the QR code with the first portion of the QR code to generate the QR code.

(M13) A method may be performed as described in any of paragraphs (M1) through (M12) wherein validating the authentication credentials comprises validating a public key and a user signature.

The following paragraphs (A1) through (A6) describe examples of apparatuses that may be implemented in accordance with the present disclosure.

(A1) An apparatus comprising a processor; memory storing computer executable instructions that, when executed by the processor, cause the apparatus to: generate a quick response (QR) code that includes an information code containing information and a server code containing an identity of the computing platform; split the QR code into a first portion of the QR code and a second portion of the QR code, wherein the first portion of the QR code includes at least the server code; send, to a QR display device, the first portion of the QR code for display; receive, from a user device, authentication credentials and a request for the second portion of the QR code, wherein the request for the second portion of the QR code is sent to the apparatus based on identification of the apparatus through scanning, by the user device, the server code at the QR display device; and send, based on validating the authentication credentials and to the user device, the second portion of the QR code, wherein the user device is configured to re-assemble the QR code based on the first portion of the QR code and the second QR code to access the information.

(A2) An apparatus as described in paragraph (A1), wherein the server code comprises a second QR code, overlaid on the QR code.

(A3) An apparatus as described in any one of paragraphs (A1)-(A2), wherein splitting the QR code comprises removing a portion of the QR code.

(A4) An apparatus as described in paragraph (A3), wherein splitting the QR code comprises removing one or more additional portions of the QR code.

(A5) An apparatus as described in paragraph (A4), wherein the one or more additional portions of the QR code are a different shape than the portion of the QR code.

(A6) An apparatus as described in any one of paragraphs (A1)-(A5) wherein one of: the first portion of the QR code or the second portion of the QR code includes information explaining reconstruction of the QR code.

The following paragraph (CRM1) describes examples of computer-readable media that may be implemented in accordance with the present disclosure.

(CRM1) A non-transitory computer-readable medium storing instructions that, when executed, cause a system to: generate, by a computing platform, a quick response (QR) code that includes an information code containing information and a server code containing an identity of the system; split the QR code into a first portion of the QR code and a second portion of the QR code, wherein the first portion of the QR code includes at least the server code; send, to a QR display device, the first portion of the QR code for display; receive, from a user device, authentication credentials and a request for the second portion of the QR code, wherein the request for the second portion of the QR code is sent to the system based on identification of the system through scanning, by the user device, the server code at the QR display device; and send, based on validating the authentication credentials and to the user device, the second portion of the QR code, wherein the user device is configured to re-assemble the QR code based on the first portion of the QR code and the second QR code to access the information.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    generating, by a computing platform, a quick response (QR) code that includes an information code containing information and a server code containing an identity of the computing platform;
    splitting the QR code into a first portion of the QR code and a second portion of the QR code, wherein the first portion of the QR code includes at least the server code;
    sending, to a QR display device, the first portion of the QR code for display;
    receiving, from a user device, authentication credentials and a request for the second portion of the QR code, wherein the request for the second portion of the QR code is sent to the computing platform based on identification of the computing platform through scanning, by the user device, the server code at the QR display device; and
    sending, based on validating the authentication credentials and to the user device, the second portion of the QR code, wherein the user device is configured to re-assemble the QR code based on the first portion of the QR code and the second QR code to access the information.

2. The method of claim 1, wherein the server code comprises a second QR code, overlaid on the QR code.

3. The method of claim 1, wherein splitting the QR code comprises removing a portion of the QR code.

4. The method of claim 3, wherein splitting the QR code comprises removing one or more additional portions of the QR code.

5. The method of claim 4, wherein the one or more additional portions of the QR code are a different shape than the portion of the QR code.

6. The method of claim 1, wherein one of: the first portion of the QR code or the second portion of the QR code includes information explaining reconstruction of the QR code.

7. The method of claim 1, wherein the server code has a different background color than the information code.

8. The method of claim 1, wherein the information cannot be accessed without both the first portion of the QR code and the second portion of the QR code.

9. The method of claim 1, wherein validating the authentication credentials comprises validating that a time gap between creation of the QR code and receipt of the authentication credentials is less than a predetermined time threshold.

10. The method of claim 1, wherein validating the authentication credentials comprises validating that a cell phone number of the user device is on a whitelist stored at the computing platform.

11. The method of claim 1, wherein sending the second portion of the QR code comprises sending a short message service (SMS) message that includes the second portion of the QR code.

12. The method of claim 1, wherein the user device is configured with a QR scanner application, and wherein the QR scanner application is preconfigured to:
    identify, based on the first portion of the QR code, locations of missing portions of the QR code, and
    combine, based on the identified locations, the second portion of the QR code with the first portion of the QR code to generate the QR code.

13. The method of claim 1, wherein validating the authentication credentials comprises validating a public key and a user signature.

14. A computing system comprising:
    a processor;
    memory storing computer executable instructions that, when executed by the processor, cause the computing system to:
        generate a quick response (QR) code that includes an information code containing information and a server code containing an identity of the computing platform;

split the QR code into a first portion of the QR code and a second portion of the QR code, wherein the first portion of the QR code includes at least the server code;

send, to a QR display device, the first portion of the QR code for display;

receive, from a user device, authentication credentials and a request for the second portion of the QR code, wherein the request for the second portion of the QR code is sent to the system based on identification of the system through scanning, by the user device, the server code at the QR display device; and send, based on validating the authentication credentials and to the user device, the second portion of the QR code, wherein the user device is configured to re-assemble the QR code based on the first portion of the QR code and the second QR code to access the information.

15. The computing platform of claim 14, wherein the server code comprises a second QR code, overlaid on the QR code.

16. The computing platform of claim 14, wherein splitting the QR code comprises removing a portion of the QR code.

17. The computing platform of claim 16, wherein splitting the QR code comprises removing one or more additional portions of the QR code.

18. The computing platform of claim 17, wherein the one or more additional portions of the QR code are a different shape than the portion of the QR code.

19. The computing platform of claim 14, wherein one of: the first portion of the QR code or the second portion of the QR code includes information explaining reconstruction of the QR code.

20. One or more non-transitory computer-readable media storing instructions that, when executed by a computing system comprising at least one processor, a communication interface, and memory, cause the computing system to:

generate, by the computing system, a quick response (QR) code that includes an information code containing information and a server code containing an identity of the computing platform;

split the QR code into a first portion of the QR code and a second portion of the QR code, wherein the first portion of the QR code includes at least the server code;

send, to a QR display device, the first portion of the QR code for display;

receive, from a user device, authentication credentials and a request for the second portion of the QR code, wherein the request for the second portion of the QR code is sent to the computing system based on identification of the computing system through scanning, by the user device, the server code at the QR display device; and send, based on validating the authentication credentials and to the user device, the second portion of the QR code, wherein the user device is configured to re-assemble the QR code based on the first portion of the QR code and the second QR code to access the information.

* * * * *